US005625839A

United States Patent [19]

Kohler et al.

[11] Patent Number: 5,625,839

[45] Date of Patent: Apr. 29, 1997

[54] SYSTEM FOR TESTING IF DESTINATION ADDRESS TRANSMITTED WITH DATA PACKET IS A VALID ADDRESS BEFORE STORAGE OF DATA INTO MEMORY OF ELECTRONIC POSTAGE METER

[75] Inventors: Armin Kohler, Eichholzstrasse; Philippe Wicht, Rue St. Joseph, both of Switzerland

[73] Assignee: Ascom Autelca AG, Berne, Switzerland

[21] Appl. No.: 384,392

[22] Filed: Feb. 3, 1995

Related U.S. Application Data

[63] Continuation of Ser. No. 176,331, Jan. 3, 1994, abandoned, which is a continuation of Ser. No. 738,477, Jul. 31, 1991, abandoned.

[51] Int. Cl.[6] .......... G06F 13/00

[52] U.S. Cl. .......... 395/824; 395/850; 395/853; 364/464.2

[58] Field of Search .......... 395/182.16, 182.19, 395/490, 842, 824, 850, 853; 340/825.23; 364/464.02

[56] References Cited

U.S. PATENT DOCUMENTS

| | | | |
|---|---|---|---|
| 4,168,469 | 9/1979 | Parikh et al. | 375/114 |
| 4,424,573 | 1/1984 | Eckert, Jr. et al. . | |
| 4,442,148 | 4/1984 | Soderberg et al. . | |
| 4,506,329 | 3/1985 | Duwel et al. . | |
| 4,525,786 | 7/1985 | Crowley et al. . | |
| 4,528,644 | 7/1985 | Soderberg et al. . | |
| 4,739,486 | 4/1988 | Soderberg et al. . | |
| 4,837,714 | 6/1989 | Brookner et al. . | |
| 4,955,305 | 9/1990 | Garnier et al. | 364/167.01 |
| 4,980,806 | 12/1990 | Taylor et al. | 364/132 |
| 5,053,797 | 10/1991 | Samuels et al. | 395/775 |
| 5,142,550 | 8/1992 | Tymes | 375/1 |
| 5,162,986 | 11/1992 | Graber | 395/275 |

FOREIGN PATENT DOCUMENTS

| | | |
|---|---|---|
| 0376486 | 7/1990 | European Pat. Off. . |
| 2188874 | 10/1987 | United Kingdom . |

*Primary Examiner*—Richard L. Ellis

*Attorney, Agent, or Firm*—Brumbaugh, Graves, Donohue & Raymond

[57] ABSTRACT

In an electronic postage meter and external servicing system, a method and apparatus are disclosed for loading data in a universal format from the external servicing device to the postage meter. Data packets sent from the external servicing device to the postage meter contain an address in the memory address space of the processor as well as data to be loaded to that address. Optionally the data packet may include a data length value and a repetition value, the repetition value indicating how many times the data are to be copied into the memory of the processor. The system overcomes limitations of the prior art in which data packets may only be sent to the meter for loading to a limited set of selectable destinations.

15 Claims, 2 Drawing Sheets

SYSTEM FOR TESTING IF DESTINATION ADDRESS TRANSMITTED WITH DATA PACKET IS A VALID ADDRESS BEFORE STORAGE OF DATA INTO MEMORY OF ELECTRONIC POSTAGE METER

This application is a continuation of application Ser. No. 08/176,331, filed on Jan. 3, 1994 now abandoned, which is in turn a continuation application of Ser. No. 07/738,477, filed on Jul. 31, 1991 now abandoned.

BACKGROUND OF THE INVENTION

The invention relates generally to techniques for loading data to an electronic postage meter from an external servicing device, and particularly for techniques for loading data efficiently by taking into account the length of the data to be loaded and the repetitive nature, if any, of the data.

Although electronic postage meters have been commonplace for many years, the predecessor mechanical postage meter is still in use. In a mechanical postage meter a descending register indicative of the amount of postage available to be printed is contained in a mechanical register of gears and other moving parts. A postage printing device is mechanically linked to the mechanical register, and the two are located in a secure housing. Protection against inadvertent or intentional printing of postage in excess of the amount available for printing is found in the security of the housing, the ease of visual detection of tampering, the relative immunity of the mechanical register to vagaries of electric power, and the positive nature of the mechanical linkage between the printer and the register.

Mechanical postage meters have some drawbacks, among them that it is time consuming to change the function of the meter. Many mechanical meters have customization details such as an initial setting of internal register components. Changing the initial setting is a purely mechanical matter calling for the use of tools and in many cases the partial or complete disassembly of the meter. Many other operating parameters and customization details of the meter are quite incapable of change by mechanical modification due to limitations in the mechanical design.

In electronic postage meters it is well known to use a processor executing a stored program to bring about many of the functions of the postage meter that would have been accomplished by mechanical means in a mechanical meter. As with mechanical meters circumstances arise from time to time in which it would be desirable to be able to change a customization detail or other operating parameter. This may be done, for example, by partially or completely disassembling the postage meter, removing some or all of the stored program or related data, and installing new or different stored program or related data. This has the drawback that it is labor-intensive and time-consuming. Because many of the steps are mechanical in nature such actions may shorten the expected service life of the postage meter. Thus attempts have been made in recent years to develop ways permitting updating of stored program or related data without requiring partial or complete disassembly of the postage meter. Although some updating and modification is possible through the keyboard, many recent attempts have been made to effect it by data communication from an external servicing device. In prior art systems, typically the external servicing device sends a packet to the postage meter. The packet contains selection information, sometimes called a "combo digit", indicative of which of a highly constrained universe of possible items are to be changed based on the contents of the packet.

In one prior art system, that of U.S. Pat. No. 4,528,644 to Pitney Bowes, the selection information indicates one of less than a dozen possible items to change. The postage meter has a routine that receives the selection information and, depending on the selection information, determines to store the data in a corresponding particular address. For each of the less than a dozen changeable items, there is an address in the stored program of the postage meter to which data may be loaded.

Such prior art systems are necessarily somewhat inflexible. For a given item in the memory to be changeable by the external servicing device, it has to be the case that the stored program that was earlier provided in the postage meter must include that item in its short list of items that are possible to change.

Such prior art systems are necessarily somewhat slow in the case of a large amount of repetitive information that is to be stored. They typically require that every byte to be loaded must pass individually over the serial line connecting the external servicing device and the postage meter.

There is thus a need for a flexible way to change and update information in the postage meter, overcoming the above-mentioned problems.

SUMMARY OF THE INVENTION

In an electronic postage meter and external servicing system according to the invention, a method and apparatus are disclosed for loading data in a universal format from the external servicing device to the postage meter. Data packets sent from the external servicing device to the postage meter contain an address in the memory address space of the processor as well as data to be loaded to that address. Optionally the data packet may include a data length value and a repetition value, the repetition value indicating how many times the data are to be copied into the memory of the processor. The system overcomes limitations of the prior art in which data packets may only be sent to the meter for loading to a limited set of selectable destinations.

BRIEF DESCRIPTION OF THE DRAWINGS

An exemplary embodiment of the invention is described with reference to drawings, of which:

FIG. 2(*b*) is a diagrammatic illustration of a prior art data packet for communication between the servicing device and the postage meter;

FIG. 2(*c*) is a flowchart and illustrates the data reception and loading routines of a prior art postage meter configuration;

FIG. 3(*b*) is a diagrammatic illustration of a data packet for communication between the servicing device and the postage meter in accordance with FIG. 3(*a*); and FIG. 3(*c*) is a flowchart and illustrates the data reception and loading routines of a postage meter configuration in accordance with FIG. 3(*a*).

Throughout the figures, like elements have been indicated where possible with like reference numerals.

DETAILED DESCRIPTION OF THE EMBODIMENT

Figure 1:
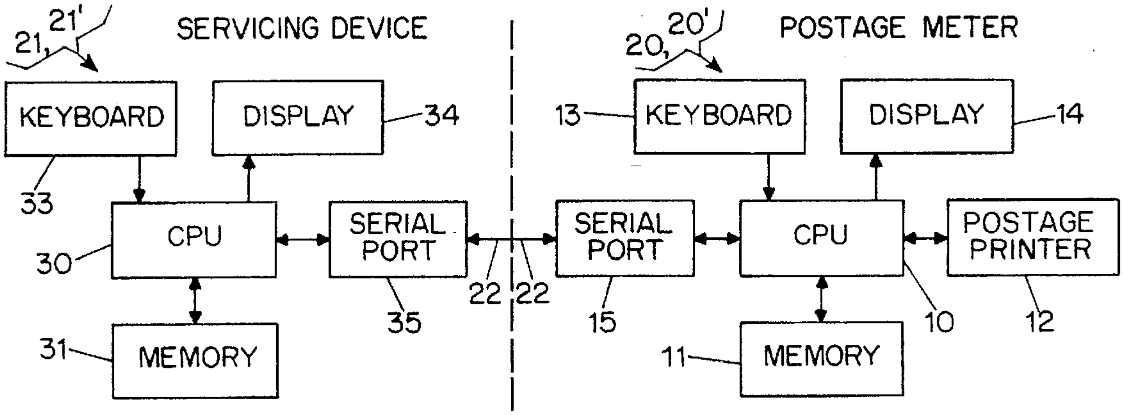
FIG. 1 is a functional block diagram and shows a postage meter and an external servicing device.

In FIG. 1, in a postage meter 20, a central processor or CPU 10 executes a stored program in a memory 11, some or all of which is nonvolatile. A postage printer 12 is controlled by the processor 10 to print postage under carefully controlled circumstances. The user may indicate at a keyboard 13 the amount of postage that is requested to be printed. A descending register value indicative of the amount of postage available to be printed is stored in the memory 11, and if the requested amount does not exceed the available amount, the postage is printed at the postage printer 12. A display 14 provides information to the user, and a serial port 15 permits the processor 10 to send and receive serial data.

A servicing device 21 has a processor 30 executing a stored program in memory 31. The operator of the servicing device may input various commands and requests to the processor 30 by the keyboard 33, and the display 34 permits the processor 30 to communicate information to the operator. A serial port 35 permits the processor 30 to send and receive serial data. A serial cable 22 can connect the servicing device 21 and the postage meter 20. The above-mentioned hardware elements of the servicing device 21 and the postage meter 20 are of conventional design and manufacture. For example, the processors 10, 30 may be 8000-series processors in the Intel product line. The serial ports may be RS-232 ports using conventional RS-232 transmitters and receivers.

Figure 2A:
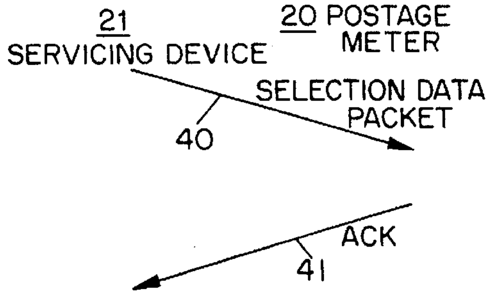
FIG. 2(*a*) is a diagrammatic illustration of a prior art protocol for communication between the servicing device and the postage meter.
Figure 2B:
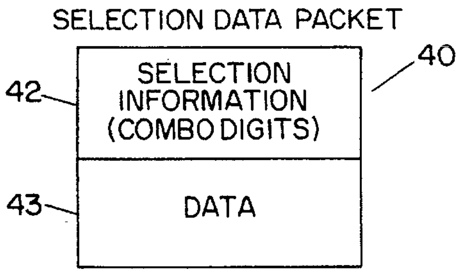
Figure 2C:
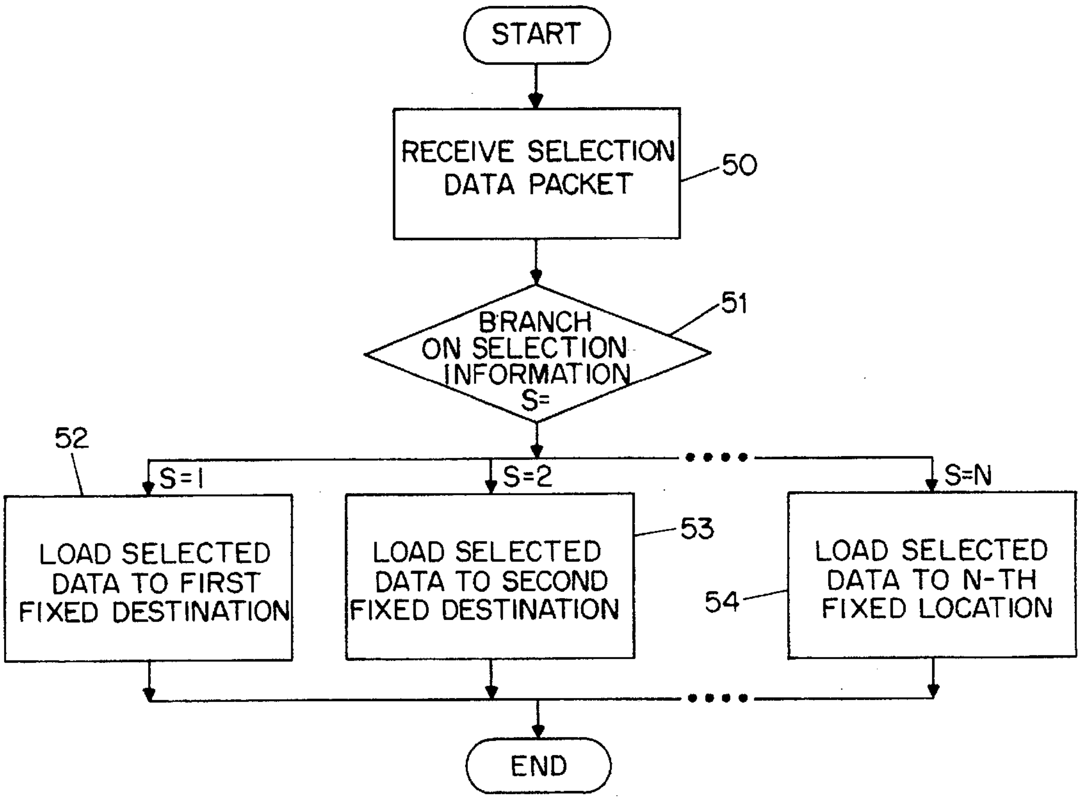

In the FIG. 2(*a*) prior art protocol for communication between the servicing device and the postage meter, first the external servicing device 21 having hardware such as shown in FIG. 1 prepares a selection data packet 40 and sends it to a postage meter 20 having hardware such as shown in FIG. 1. Upon receipt of the packet the meter sends an acknowledgment 41 to the servicing device. FIG. 2(*b*) depicts the prior art selection data packet 40 in some detail. Selection information 42, sometimes called a "combo digit", forms part of the packet. Also present in the packet are data 43 relating to the selection.

In the flowchart of FIG. 2(*c*), of the prior art data reception and loading routines, the data packet 40 is received in block 50. The selection information is extracted from the packet and becomes the determinant in a selection process that starts at block 51. If the selection information has a value of 1, the program continues to block 52. The program of block 52 causes the data in the packet to be loaded to some predetermined address in the postage meter memory. If the selection information has a value of 2, the program continues to block 53. The stored program for block 53 causes the data in the packet to be loaded to some other predetermined address in the postage meter memory. In FIG. 2(*c*), N represents the last of the meaningful selection values. If the selection value is equal to N, the last block 54 is executed and the data are loaded into an Nth predetermined location.

From FIG. 2(*c*) one of the drawbacks of the prior art may be seen; for a given item in memory to be updatable or changeable through the program of FIG. 2(*c*) it is necessary that the writer of the program of FIG. 2(*c*) have anticipated that it might be desirable to change that given item. The system lacks flexibility.

Figure 3A:
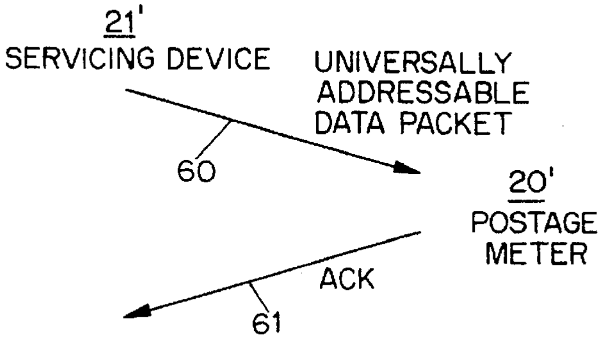
FIG. 3(*a*) is a diagrammatic illustration of a protocol in accordance with an embodiment of the invention for communication between the servicing device and the postage meter.
Figure 3B:
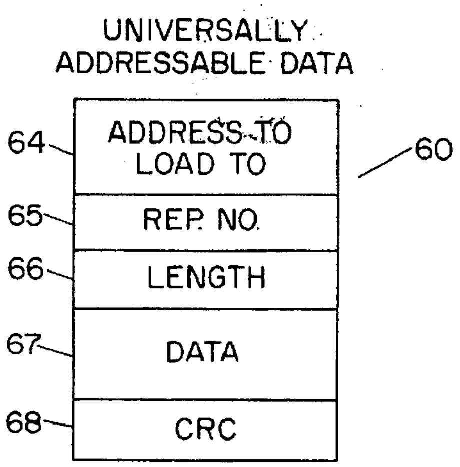
Figure 3C:
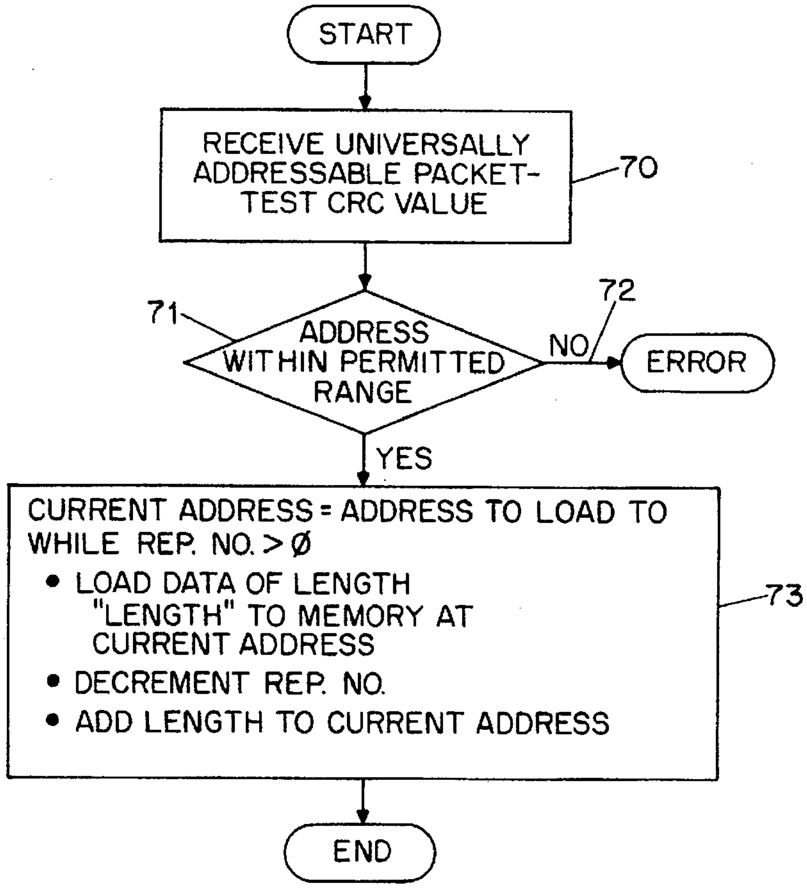

In the FIG. 3(*a*) protocol of the invention, the servicing device 21' having hardware such as that shown in FIG. 1 prepares and transmits a universally addressable data packet 60 to the postage meter 20', which has hardware such as that shown in FIG. 1. The servicing device 21' differs from a prior art servicing device 21 in the stored program in the memory 31. The postage meter 20' differs from a prior art postage meter 20 in the stored program in the memory 11.

FIG. 3(*b*) depicts a data packet 60 for communication between the servicing device 21' and the postage meter 20'. The data packet 60 has a value 64 indicative of the address to load to. In the simple case the value 64 is the address itself. Also in packet 60 is an optional value 65 indicating how many times the data are to be loaded into memory. Also in packet 60 is an optional value 66 indicative of the length of the data, typically expressed as a byte count. The data 67 also form part of the packet. Finally a checksum or CRC (cyclic redundancy check) portion is preferably part of the packet, providing a high confidence level that the packet has been received intact.

FIG. 3(*c*) shows in flowchart form the data reception and loading routines of a postage meter configuration in accordance with the disclosed embodiment of the invention. At block 70 the postage meter, having received the data packet, preferably tests the CRC value to confirm that the packet has been received intact.

At block 71 a test is made to determine whether the requested address (or range of addresses, as discussed below) falls within the permitted range of modifiable addresses. For example, in the memory space of the processor 10 of a postage meter 21' there are typically a number of memory devices making up the memory of the postage meter. For at least some of the memory devices, there will be some regions within which it is desired that changes be possible, and other regions within which it is desired that changes not be possible.

In the simple case of a data packet containing a single item of data (e.g. one byte) it is enough to do range checking on the single address in the data packet. In accordance with the invention, however, it is expected that several bytes might be loaded by means of a single packet. In that case, the range test will desirably take into account all the proposed load addresses. Also in accordance with the invention there is desirably a "repeat" feature. If a "repeat" value, also called a repetition number, is provided in the data packet, the postage meter loads the data repeatedly into successive locations in memory. In that case, the range checking will desirably take into account all the proposed load addresses through the repeated load process.

Assuming the range checking reaches an affirmative result, execution proceeds to block 73. If the range checking detects a potential violation an error is handled at 72.

In block 73 a construct familiarly known as the DO-WHILE or FOR-NEXT construct is invoked. An initial value for a variable "current address" is set at the address from the data packet. Assuming the repetition number (initially determined by the value 65 in block 60) is greater than zero, then the data are loaded into successive locations in memory. The repetition number is decremented and the current address is increased by the length 66 or number of bytes of data. The loading, decrementing, and adding steps are repeated so long as the repetition number is greater than zero.

The repetition feature is most helpful when a postage meter is being configured or reconfigured. The memory 11 desirably contains locations where historical information may be stored regarding past postage meter transactions, but this may take up hundreds or thousands of bytes. Loading via the serial line 22 all the bytes for the locations would take a long time. If the design of the meter 20' is such that the initial values for those locations is, say, all zeros, or data that repeat every sixteen bytes, then in keeping with the invention the pattern may be established by one or a small number of bytes, and the repeat value greatly shortens the duration of the necessary connection at the serial line 22. In one system according to the invention the time saved is on the order of more than a minute.

Those skilled in the art will readily appreciate that the embodiment could change in many respects and nonetheless enjoy the advantages provided by the invention. The memory 11 is, for example, preferably nonvolatile RAM, but could equivalently be disk storage or other storage that persists even after external power to the postage meter is removed. The communications channel 22 is serial RS-232 asynchronous in design, but could equivalently be infrared optical communication, capacitively coupled electrical communication, or RF and could be synchronous rather than asynchronous. The address information 64 is preferably the address itself together with bank-switching information if the system is bank-switched, but could be equivalently encoded as a value that is not identical to, but is nonetheless indicative of an address. The packet 60 could be transmitted in encrypted form if desired. The stored program portrayed in FIG. 3(*c*) could be written in any of a variety of programming languages and the steps of block 73 could be accomplished equivalently by IF statements or other conditional instructions rather than the preferred DO-WHILE or FOR-NEXT constructs. Thus while a specific preferred embodiment has been described, this is merely exemplary and those skilled in the art will perceive numerous modifications and variations of the embodiment without departure from the spirit and scope of the invention, as defined by the appended claims.

We claim:

1. A method of transferring data to an electronic postage meter from an external servicing device, the postage meter having a processor having an address space and memory in the address space of the processor, comprising the steps of:

preparing a data packet comprising address information indicative of a desired address range within the address space of the processor and at least one byte of data for transferring thereto;

transmitting the data packet from the external servicing device to the postage meter;

receiving the data packet into a memory of the postage meter;

testing to determine whether the address range indicated by the address information in the data packet is within a predetermined range of addresses within the address space, contents of said predetermined range of addresses being modifiable by the data contained in the data packet; and transferring the data in the data packet to the address indicated by the address information in the data packet if the address indicated by the address information in the data packet is within the predetermined range of addresses within the address space.

2. The method of claim 1 wherein the preparing step further comprises including within the data packet a check value determined as a function of the address information and the data thereof, and wherein the receiving step further comprises testing to determine whether the check value is in a predetermined relationship with a confirmation value determined as a function of the received address information and the received data of the data packet, and wherein the loading step is performed only in the event of the test being satisfied.

3. The method of claim 1 wherein the step of preparing a data packet comprising address information comprises including within the data packet an address within the address space and a length number representing the number of bytes of data that are to be loaded into the memory of the processor, the address information comprising the address and the length number, wherein the receiving step further comprises testing to determine whether the sum of the length number and the address indicated by the address information in the data packet is within a predetermined range of addresses within the address space, and wherein the loading step is performed only in the event of the test being satisfied.

4. The method of claim 3 wherein the preparing step further comprises including within the data packet a repetition number representing the number of times the data are to be loaded into the memory of the processor, wherein the receiving step further comprises testing to determine whether the product of the length number and the repetition number, added to the address indicated by the address information in the data packet, is within a predetermined range of addresses within the address space, and wherein the loading step is performed only in the event of the test being satisfied, the loading step further comprising the steps of establishing a current address initially equal to the address indicated by the address information in the data packet, loading the data to the current address, decrementing the number of times the data are to be loaded, adding the length number to the current address, the loading, decrementing, and adding steps being repeated until the number of times the data are to be loaded reaches zero.

5. The method of claim 1 wherein the step of preparing a data packet comprising address information comprises including within the data packet an address within the address space and a repetition number representing the number of times the data are to be loaded into the memory of the processor, the address information comprising the address and the repetition number, wherein the receiving step further comprises testing to determine whether the product of the number of bytes of data and the repetition number, added to the address indicated by the address information in the data packet, is within a predetermined range of addresses within the address space, and wherein the loading step is performed only in the event of the test being satisfied, the loading step further comprising the steps of establishing a current address initially equal to the address indicated by the address information in the data packet, loading the data to the current address, decrementing the number of times the data are to be loaded, adding the number of bytes of data to the current address, wherein the loading, decrementing, and adding steps are repeated until the number of times the data are to be loaded reaches zero.

6. An electronic postage meter comprising a processor having an address space, memory in the address space of the processor, a receiver for receiving a data packet from an external servicing device said data packet comprising address information indicative of an address within the address space of the processor and at least one byte for loading thereto, and storing means comprising:

receiving means for receiving the data packet into a memory of the postage meter;

loading means for loading the data in the data packet to the address indicated by the address information in the data packet;

wherein the receiving means further comprises means for testing to determine whether the address indicated by the address information in the data packet is within a predetermined range of addresses within the address space, and wherein the loading means loads the data only in the event of the test being satisfied.

7. The electronic meter of claim 6 wherein the data packet further comprises a check value determined as a function of the address information and the data thereof, and wherein the receiving means further comprises means for testing to determine whether the check value is in a predetermined relationship with a confirmation value determined as a function of the received address information and the received data of the data packet, and wherein the loading means loads the data only in the event of the test being satisfied.

8. The electronic meter of claim 6 wherein the data packet further comprises an address within the address space and a length number representing the number of bytes of data that are to be loaded into the memory of the processor, wherein the receiving means further comprises means for testing to determine whether the sum of the length number and the address indicated by the address information in the data packet is within a predetermined range of addresses within the address space, and wherein the loading means loads the data only the event of the test being satisfied.

9. The electronic meter of claim 8 wherein the data packet further comprises an address within the address space and a repetition number representing the number of times the data are to be loaded into the memory of the processor, wherein the receiving means further comprises means for testing to determine whether the product of the length number and the repetition number, added to the address indicated by the address information in the data packet, is within a predetermined range of addresses within the address space, wherein the loading means loads the data only in the event of the test being satisfied, and wherein the loading means further comprises means for establishing a current address initially equal to the address indicated by the address information in the data packet, for loading the data to the current address, for decrementing the number of times the data are to be loaded, for adding the length number to the current address, and for repeating the loading, decrementing, and adding steps until the number of times the data are to be loaded reaches zero.

10. The electronic postage meter of claim 6 wherein the data packet further comprises an address within the address space and a repetition number representing the number of times the data are to be loaded into the memory of the processor, wherein the receiving means further comprises means for testing to determine whether the product of the number of bytes of data and the repetition number, added to the address indicated by the address information in the data packet, is within a predetermined range of addresses within the address space, wherein the loading means loads the data only in the event of the test being satisfied, and wherein the loading means further comprises means for establishing a current address initially equal to the address indicated by the address information in the data packet, for loading the data to the current address, for decrementing the number of times the data are to be loaded, for adding the length number to the current address, and for repeating the loading, decrementing, and adding steps until the number of times the data are to be loaded reaches zero.

11. A system comprising an external servicing device in communication with a postage meter, said external servicing device comprising preparing means for preparing a data packet comprising address information indicative of an address in an address space and at least one byte of data for transfer thereto and means for transmitting the data packet from the external servicing device to said postage meter;

said postage meter comprising a processor having an address space, memory in the address space of the processor, means for receiving the data packet, testing means for testing to determine whether the address indicated by the address information in the data packet is within a predetermined range of addresses within said address space and loading means for loading said data packet into the memory of said postage meter, wherein said data is loaded into the memory of said postage meter only after testing by the postage meter determines that the address indicated by the address information in the data packet is within a predetermined range of addresses within the address space.

12. The system of claim 11 wherein the preparing means of the external servicing device further comprises means for including within the data packet a check value determined as a function of the address information and the data thereof.

13. The system of claim 11 wherein the preparing means of the external servicing device further comprises means for including within the data packet a length number representing the number of bytes of data that are to be loaded into the memory of the processor.

14. The system of claim 13 wherein the preparing means of the external servicing device further comprises means for including within the data packet a repetition number representing the number of times the data are to be loaded into the memory of the processor.

15. The system of claim 11 wherein the preparing means of the external servicing device further comprises means for including within the data packet a repetition number representing the number of times the data are to be loaded into the memory of the processor.

* * * * *